(12) United States Patent
Tanabe

(10) Patent No.: US 7,030,059 B2
(45) Date of Patent: Apr. 18, 2006

(54) METAL CATALYST CARRIER

(75) Inventor: Hiroshi Tanabe, Nakano-ku (JP)

(73) Assignee: Calsonic Kansei Corporation, Tokyo (JP)

( * ) Notice: Subject to any disclaimer, the term of this patent is extended or adjusted under 35 U.S.C. 154(b) by 307 days.

(21) Appl. No.: 10/732,303

(22) Filed: Dec. 11, 2003

(65) Prior Publication Data

US 2004/0121908 A1 Jun. 24, 2004

(30) Foreign Application Priority Data

Dec. 11, 2002 (JP) ............................. 2002-359900

(51) Int. Cl.
B01J 32/00 (2006.01)
F01N 3/28 (2006.01)
B32B 3/28 (2006.01)

(52) U.S. Cl. ................. 502/439; 502/527.22; 422/180; 428/593; 428/596; 428/603

(58) Field of Classification Search ...................... None
See application file for complete search history.

(56) References Cited

U.S. PATENT DOCUMENTS

| | | | | |
|---|---|---|---|---|
| 4,152,302 A | * | 5/1979 | Nonnenmann et al. ...... | 502/338 |
| 4,273,681 A | * | 6/1981 | Nonnenmann ............... | 502/338 |
| 4,665,051 A | * | 5/1987 | Nonnenmann ............... | 502/439 |
| 4,753,918 A | | 6/1988 | Cyron | |
| 4,886,711 A | * | 12/1989 | Foldvary ..................... | 428/592 |
| 4,958,428 A | * | 9/1990 | Humpolik ..................... | 29/890 |
| 4,987,034 A | * | 1/1991 | Hitachi et al. .............. | 428/593 |
| 5,045,403 A | * | 9/1991 | Maus et al. .................. | 428/593 |
| 5,436,216 A | * | 7/1995 | Toyao et al. ................. | 502/439 |
| 5,567,395 A | * | 10/1996 | Okabe et al. ................ | 422/180 |
| 5,599,509 A | * | 2/1997 | Toyao et al. ................. | 422/180 |
| 5,648,050 A | * | 7/1997 | Matsumoto et al. ......... | 422/180 |
| 5,791,043 A | * | 8/1998 | Okabe et al. .................. | 29/890 |
| 6,287,523 B1 | * | 9/2001 | Hirohashi et al. ........... | 422/180 |
| 6,761,980 B1 | * | 7/2004 | Sato et al. .................... | 428/593 |
| 2005/0170957 A1 | * | 8/2005 | Maus et al. .................. | 502/439 |

FOREIGN PATENT DOCUMENTS

| | | | |
|---|---|---|---|
| JP | 64-63045 | * | 3/1989 |
| JP | 1-242152 | * | 9/1989 |
| JP | 6-312141 | * | 11/1994 |

* cited by examiner

*Primary Examiner*—John J. Zimmerman
(74) *Attorney, Agent, or Firm*—Wenderoth, Lind & Ponack, L.L.P.

(57) ABSTRACT

A metal catalyst carrier has a core comprising a corrugated sheet and a flat sheet with a plurality of slots in a shape elongated in a direction perpendicular to a cell passage direction. The slots are formed before a sheet metal is corrugated and have a predetermined interval apart from one another. The plural slots disposed along the direction perpendicular to the cell passage direction are arranged to form a plurality of slot arrays arranged in the cell passage direction, and an interval Y in the cell passage direction and an interval X in the direction perpendicular to the cell passage direction, between the opening peripheral edge portions of the slots adjacent to each other in the slot arrays adjacent to each other, are set under the conditions satisfying $X \geq 0$ mm and $X \geq -(5/2)Y+10$ mm, thereby preventing the occurrence of distortions and cracks in the process of corrugating the sheet metal.

8 Claims, 6 Drawing Sheets

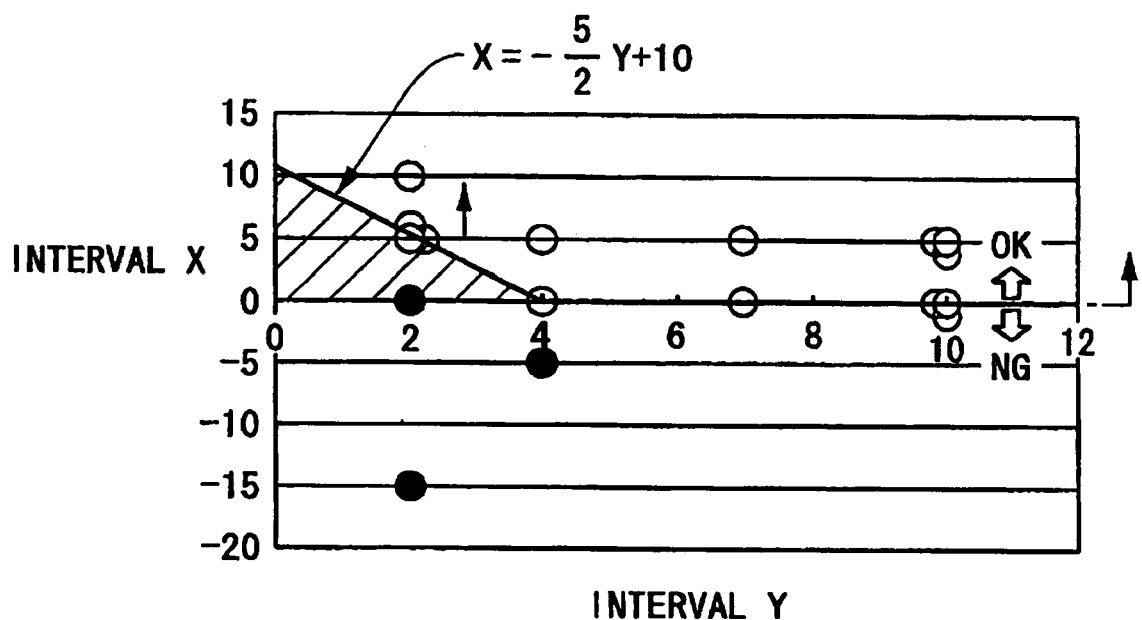
F I G. 4

METAL CATALYST CARRIER

BACKGROUND OF THE INVENTION

1. Field of the Invention

The present invention relates to a metal catalyst carrier that is installed in an exhaust system of an internal combustion engine and the like to purify exhaust gas.

2. Description of the Related Art

A conventional metal catalyst carrier is disclosed in Japanese Patent Laid-open Tokkai 2002-143693. This metal catalyst carrier is produced by several manufacturing processes including a preparing process of preparing sheet metals for a corrugated sheet and a flat sheet, a slot forming process of forming the sheet metal for at least the corrugated sheet out of the corrugated sheet and the flat sheet with a plurality of slots, a corrugating process of corrugating one of the metal sheet formed with the slots, a rolling process of stacking the corrugated sheet and the flat sheet and rolling them in multi-layers to obtain a cylindrical core, and a press-fitting process of press-fitting the core into an outer cylinder.

The core, therefore, is provided with a plurality of cell passages, formed between the corrugated sheet and the flat sheet, through which exhaust gas from an engine passes to the atmosphere.

The slots, through which the exhaust gas passes from one to another of the cell passages, constitutes a plurality of slot arrays each of which has the plural slots and is set in a cell passage direction. The slot arrays are arranged to have a predetermined interval equal to zero or larger than zero in a direction perpendicular to the cell passage direction between opening peripheral edge portions of the slots adjacent to each other in the slot arrays adjacent to each other so as not to overlap each other. The above predetermined interval is set to prevent the sheet metal with the slots from being distorted or cracked during the corrugating process.

However, our experiment results have shown that the above condition of the arrangement of the slots is not sufficient for preventing distortions and cracks in the corrugating process of the sheet metal.

Specifically, under the above condition of the arrangement of slots, when an interval in the cell passage direction between the slots adjacent to each in the slot arrays adjacent to each other is less than a predetermined value, the probability that the sheet metal with slots is distorted or cracked in the corrugated process becomes high. Especially when the interval in the direction perpendicular to the cell passage direction is zero, the setting of the interval in the cell passage direction will be another important condition for arranging the slots to avoid the distortions and the cracks.

SUMMARY OF THE INVENTION

It is an object of the present invention to provide a metal catalyst carrier that can prevent a corrugated sheet from being distorted or cracked in a manufacturing process of corrugating a sheet metal with slots and thereby lead to better productivity.

In order to achieve the object stated above, a metal catalyst carrier of the present invention includes: a highly corrugated sheet made of a sheet metal; and one of a slightly corrugated sheet and a flat sheet made of a sheet metal, the slightly corrugated sheet having a smaller corrugation than a corrugation of the highly corrugated sheet, wherein the highly corrugated sheet and the one of the slightly corrugated sheet and the flat sheet are stacked and rolled in multi-layers so as to form cell passages through which exhaust gas passes between the highly corrugated sheet and the one of the slightly corrugated sheet and the flat sheet, the highly corrugated sheet being provided with a plurality of slot arrays arranged in a cell passage direction respectively, the slot arrays having a plurality of slots formed before the sheet metal is corrugated and arranged in a direction perpendicular to the cell passage direction respectively, and wherein an interval X is set in the direction perpendicular to the cell passage direction between opening peripheral edge portions of the slots adjacent to each other in the slot arrays adjacent to each other, an interval Y being set in the cell passage direction between the opening peripheral edge portions of the slots adjacent to each other in the slot arrays adjacent to each other, the interval X and the interval Y being set under a condition satisfying $X \geq 0$ mm and $X \geq -(5/2)Y + 10$ mm.

The metal catalyst carrier of the present invention prevents the occurrence of distortions and cracks in the process of corrugating the sheet metal when the interval Y in the cell passage direction and the interval X in the direction perpendicular to the cell passage direction, between the opening peripheral edge portions of the slots adjacent to each other in the slot arrays adjacent to each other, are set under the above-described conditions.

Specifically, the occurrence of the distortions and cracks in the process of corrugating the sheet metal is prevented by such setting that the interval Y in the cell passage direction is 4 mm or more when the interval X in the direction perpendicular to the direction of the cell passage is zero as the condition of the minimum interval X.

As the interval Y in the cell passage direction is increased, the interval X in the direction perpendicular to the cell passage direction can be set narrower by a 5/2 ratio of an increased amount of the interval Y, and when the interval Y is 4 mm, the interval X can be set to zero as the condition of the minimum interval X.

According to the metal catalyst carrier of a preferred embodiment, the highly corrugated sheet is 20 μm to 50 μm in sheet thickness.

From the result of our experiments that were conducted adopting the highly corrugated sheets with a sheet thickness in a range of 20 μm to 50 μm commonly used as a material of a highly corrugated sheet, it has been also confirmed that, in the metal catalyst carrier of this preferred embodiment, the distortions and cracks in corrugating the sheet metal is prevented by setting the intervals X and Y under the condition satisfying $X \geq 0$ mm and $X \geq -(5/2)Y + 10$ mm.

According to the metal catalyst carrier of another preferred embodiment, a length L of each of the slots in the direction perpendicular to the cell passage direction is set under a condition of $L \leq 15$ mm.

In the metal catalyst carrier of this preferred embodiment, no occurrence of distortions or cracks in the process of corrugating the sheet metal was observed when the length L was 15 mm or less, even though the occurrence of the distortions or cracks was observed when the length L exceeded 15 mm, in experiments conducted under the conditions that the length L of each of the slots in the direction perpendicular to the cell passage direction was varied in metal catalyst carriers that were formed under the condition satisfying $X \geq 0$ mm and $X \geq -(5/2)Y + 10$ mm or under the condition that the sheet metal was 20 μm to 50 μm in sheet thickness.

According to the metal catalyst carrier of a still further preferred embodiment, the interval Y in the cell passage direction between the opening peripheral edge portions of the slots adjacent to each other in the slot arrays adjacent to each other and a pitch P of the slots in each of the slot arrays are set under a condition of $Y \geq -(1/2)P+14.5$ mm.

It has been confirmed from our experiments that the occurrence of the distortions and the cracks in the process of corrugating the sheet metal is prevented in this metal catalyst carrier of this preferred embodiment when the interval Y in the cell passage direction between the opening peripheral edge portions of the slots adjacent to each other in the slot arrays adjacent to each other and the pitch P of the slots in each of the slot arrays are set under the above-described condition in the metal catalyst carrier that is formed under any one of the condition satisfying $X \geq 0$ mm and $X \geq -(5/2)Y+10$ mm, the condition that the sheet metal is 20 μm to 50 μm in sheet thickness, and the condition of $L \leq 15$ mm.

Specifically, when the pitch P is set to 29 mm or more, even the setting of the interval Y to zero prevents the occurrence of the distortions and the cracks in corrugating the sheet metal, and as the pitch P is more reduced from 29 mm, it is necessary to widen the interval Y by a 1/2 ratio of a reduced amount of the interval P to avoid the occurrence of the distortions and the cracks.

BRIEF DESCRIPTION OF THE DRAWINGS

FIG. 4 is experiment result data showing the correlation between an interval X in a direction perpendicular to a cell passage direction and an interval Y in the cell passage direction between the slots adjacent to each other in slot arrays adjacent to each other;

DETAILED DESCRIPTION OF THE PREFERRED EMBODIMENTS

Hereinafter, an embodiment of the present invention will be described with reference to the accompanying drawings.

First, a structure of a metal catalyst carrier of the embodiment according to the present invention will be described with reference to FIGS. 1 to 3.

Figure 1:
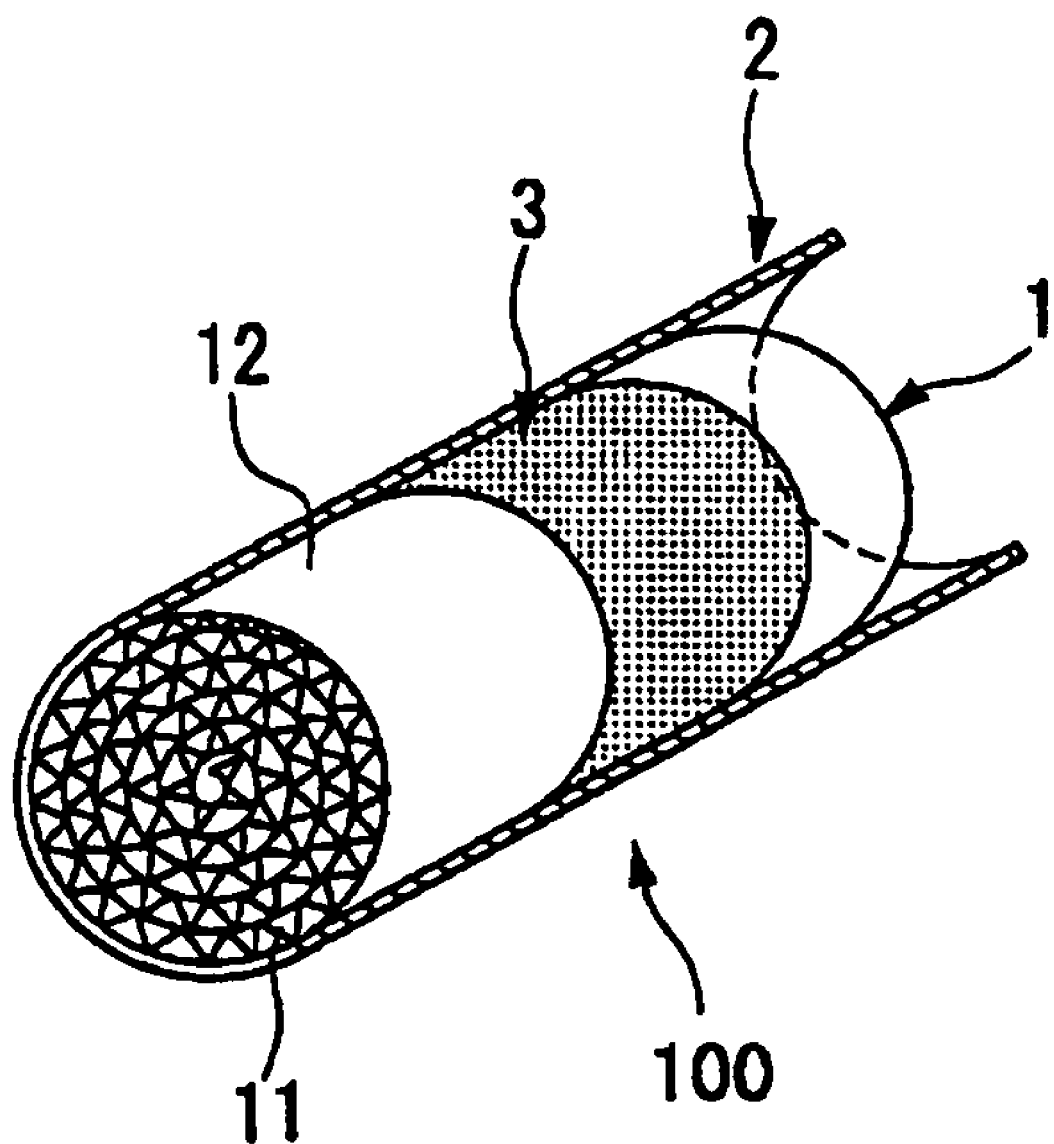
FIG. 1 is a perspective view partly in section showing a metal catalyst carrier of an embodiment of the present invention.
Figure 2:
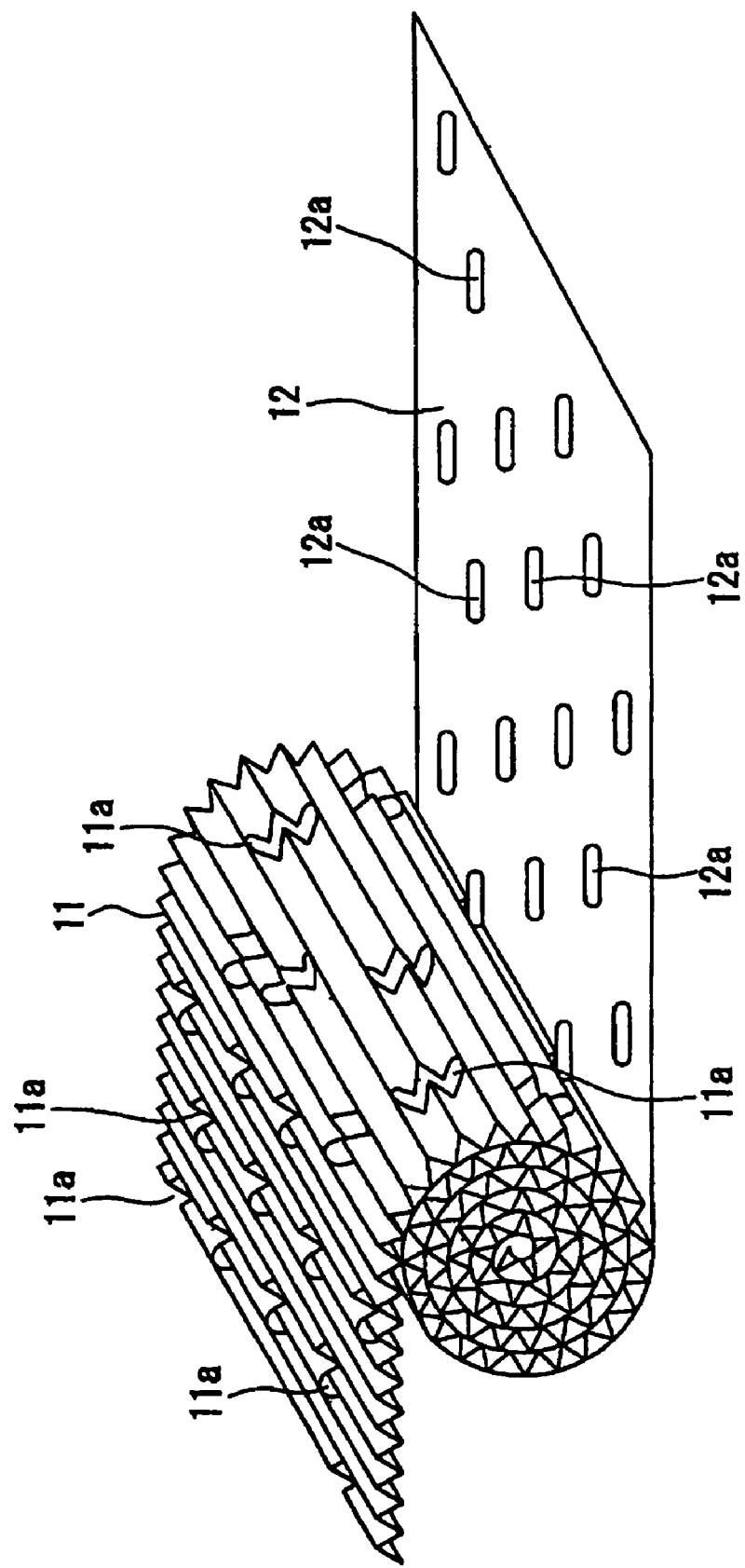
FIG. 2 is an enlarged perspective view showing a corrugated sheet and a flat sheet in a process of stacking and rolling them to obtain a core of the metal catalyst carrier of the embodiment of the present invention.

FIG. 1 is a perspective view partly in section showing a metal catalyst carrier 100 of the embodiment according to the invention, and FIG. 2 is a perspective view showing a corrugated sheet 11 and a flat sheet 12 in a process of stacking and rolling them.

Referring to FIG. 1, the metal catalyst carrier 100 has a core 1, an outer cylinder 2 in which the core 1 is press-fitted, and a brazing foil material 3 interposed between the core 1 and the outer cylinder 2.

The outer cylinder 2 is made of SUS430 ferritic stainless sheet material with a sheet thickness of 1 mm to 2 mm, and formed in a cylindrical shape with an inside diameter smaller than an outside diameter of the core 1 before the core 1 is press-fitted in the outer cylinder 2.

The brazing foil material 3 is wound around the outer peripheral surface of the core 1 before the core 1 is press-fitted in the outer cylinder 2. In this embodiment of the invention, this brazing foil material 3 covers a part of the outer peripheral surface of the core 1 at its middle portion deviated from the center of the core 1 toward an exhaust gas outlet side end portion (right end portion in FIG. 1) of the core 1.

As shown in FIGS. 1 and 2, the core 1 is constructed so that the corrugated sheet 11 and the flat sheet 12, both made of a sheet metal with a sheet thickness of 30 μm, are stacked each other and rolled in multi-layers with the flat sheet 12 being on the outer side of the core 1, which forms a honeycomb structure.

The honeycomb structure is disposed in an exhaust gas passage from an internal combustion engine, not shown, to reduce HC, CO, NOx, and so on in exhaust gas. It has a plurality of honeycomb passages (cell passages), defined by walls of the corrugated sheet 11 and the flat sheet 12, with a catalyst carrier layer, formed on the surfaces of the walls, which is made of alumina or the like and carries noble metal for purifying exhaust gas passing through the cell passages. The corrugated sheet 11 functions as a highly corrugated sheet of the present invention.

The corrugated sheet 11 is obtained by corrugating a flat sheet metal formed with a plurality of slots 11a. As shown in FIGS. 2 and 3, the slots 11a are formed before corrugating the flat sheet metal to have a predetermined length L and disposed so as to be a predetermined intervals X and Y between the slots which are adjacent to each other in a cell passage direction and in a direction perpendicular to the cell passage direction respectively, which will be described in detail later.

The flat sheet 12 is also formed with a plurality of slots 12a having a predetermined length that are disposed so as to have predetermined intervals between the slots adjacent to each another in the same directions as the corrugated sheet 11 respectively.

Specifically, in the metal catalyst carrier 100, in order to improve an exhaust gas purifying performance, it is effective to actively cause turbulent motion of the exhaust gas when passing through the cell passages to contact the exhaust gas to the noble metal as much as possible. For this purpose, a large number of the slots 11a and 12a in a shape elongated in the direction perpendicular to the cell passages are formed in the corrugated sheet 11 and the flat sheet 12 respectively. Thus, the exhaust gas is allowed to pass from one to another of the cell passages, separated by the wall of the corrugated sheet 11 and the flat sheet 12, through these slots 11a and 12a so that the flow of the exhaust gas inside the core 1 is further promoted to be turbulent in a width direction (direction perpendicular to the cell passage direction), thereby improving the exhaust gas purifying performance.

Next, an experiment as described below was conducted using sheet metals, widely used, with a sheet thickness of 30 μm as a material of the corrugated sheet 11 in order to verify what dimension and layout pattern of the slots 11a can prevent the occurrence of distortions and cracks when this thin sheet with the slots 11a formed therein is corrugated by a corrugating machine with, for example, a 600 cell roll gear.

Figure 3:
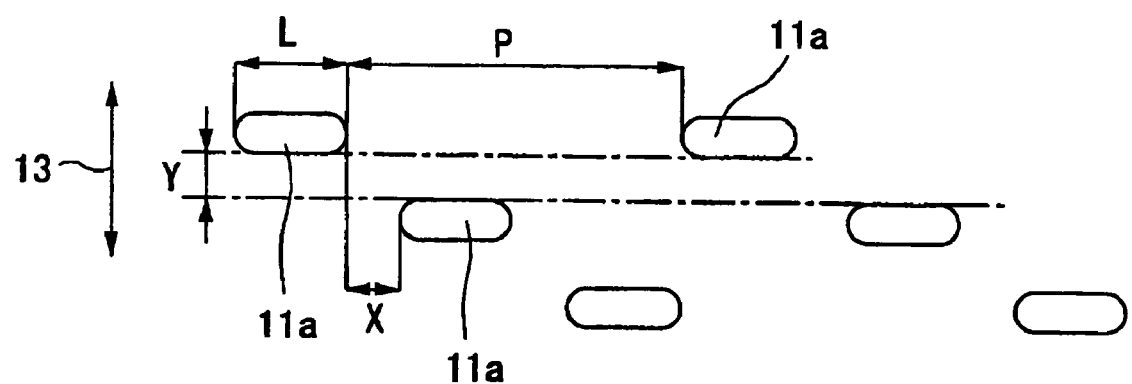
FIG. 3 is a plane view showing a layout pattern of slots in the metal catalyst carrier of the embodiment of the present invention.

Specifically, FIG. 3 shows a layout pattern where a plurality of slot arrays, each constituted of the plural slots 11a disposed along the direction perpendicular to the cell passage direction 13, are arranged in the cell passage direction 13, and sheet metals in which layout patterns were variously set by varying the interval Y, the interval X, the length L, and a pitch P are prepared, the interval Y being an interval in the cell passage direction 13 between opening peripheral edge portions of the slots 11a adjacent to each other in the slot arrays adjacent to each other, the interval X being an interval in the direction perpendicular to the cell passage direction 13 between the opening peripheral edge portions of the slots 11a adjacent to each other in the slot arrays adjacent to each other, the length L being a length of each of the slots 11a in the direction perpendicular to the cell passage direction 13, and the pitch P being a pitch of the slots 11a adjacent to each other in each of the slot arrays. After these prepared sheet metals formed with the slots 11a were corrugated, they were checked how distortions and cracks occurred in each of the corrugated sheets 11.

Figure 5:
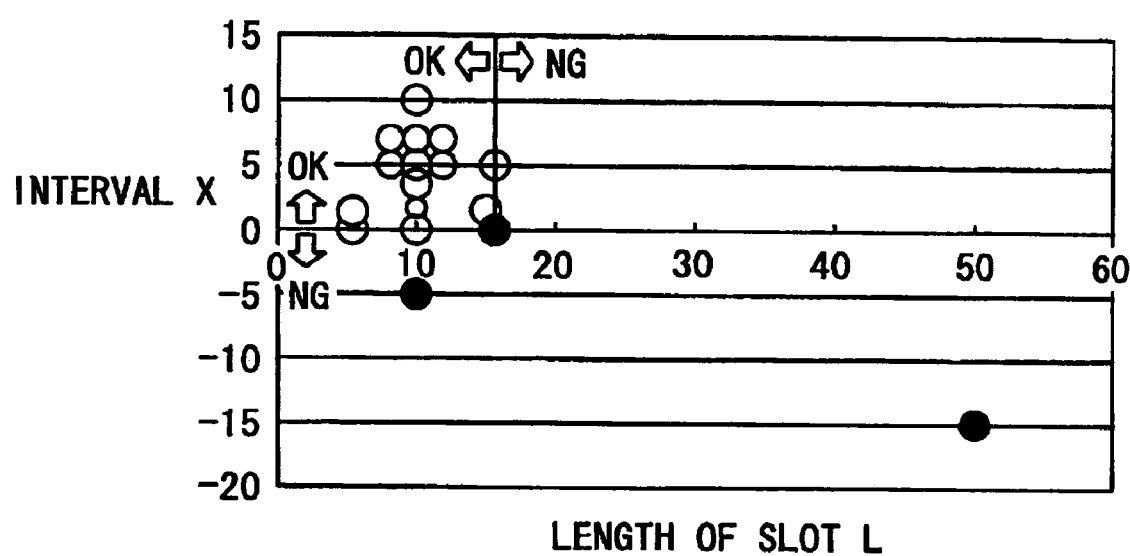
FIG. 5 is experiment result data showing the correlation between the interval X in the direction perpendicular to the cell passage direction between the slots adjacent to each other and a slot length L in the slot arrays adjacent to each other.
Figure 6:
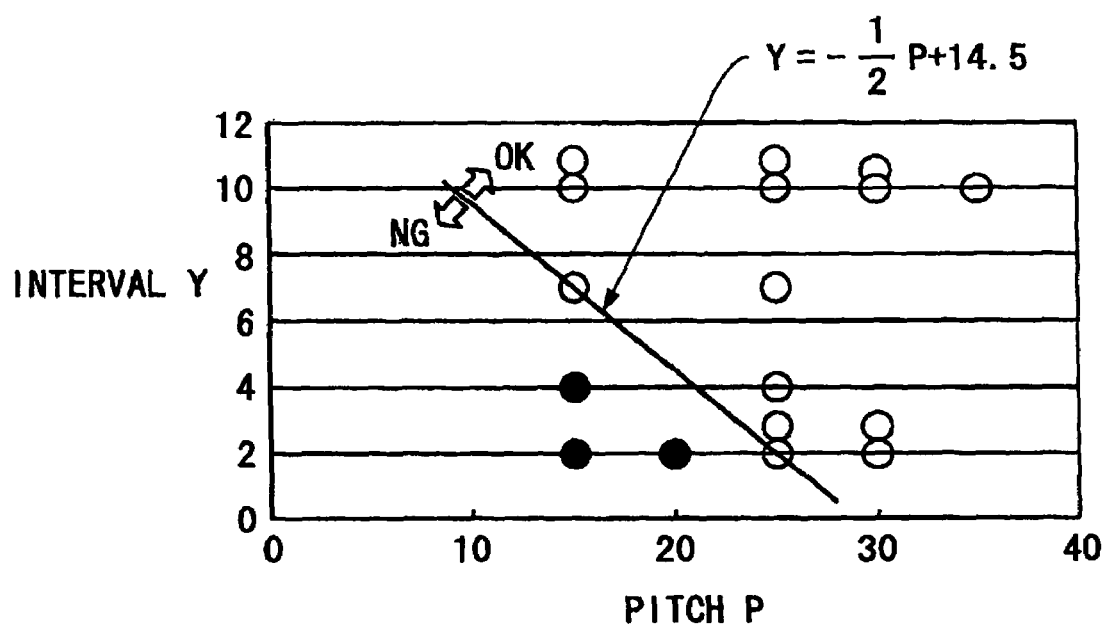
FIG. 6 is experiment result data showing the correlation between the interval Y in the cell passage direction and a pitch P between the slots adjacent to each other in the slot arrays adjacent to each other.

FIG. 4 to FIG. 6 are data showing the results of the above-described experiment. FIG. 4 shows the correlation between the interval X and the interval Y, FIG. 5 shows the correlation between the interval X and the length L, and FIG. 6 shows the correlation between the interval Y and the pitch P. Note that marks "OK" and "NG" in these data indicate ranges where no distortion or crack occurred and ranges where the occurrence of distortions or cracks was observed, respectively.

First, as shown in the data of FIG. 4, it has been found out from the experiment result that the occurrence of the distortions and cracks in the corrugated sheet was prevented when the interval Y in the cell passage direction 13 and the interval X in the direction perpendicular to the cell passage direction 13 are set under the condition satisfying the following:

$$X \geq 0 \text{ mm and } X \geq -(5/2)Y+10 \text{ mm}$$

Specifically, this results means that when the interval Y is set to 4 mm or more with the interval X being set to zero, as a condition where the interval X is the minimum, the occurrence of the distortions or the cracks in the corrugated sheet is prevented.

On the other hand, as the interval Y is increased, the interval X can be set narrower by a 5/2 ratio of an increased amount of the interval Y without the occurrence of the distortions or the cracks. When the interval Y is 4 mm, the interval X can be set to zero, which is the condition where the interval X is the minimum.

Next, as shown in the data of FIG. 5, in the experiment conducted with the length L of each of the slots 11a in the direction perpendicular to the cell passage direction 13 being varied. No occurrence of the distortions or the cracks in the corrugated sheet was observed when the length L was 15 mm or less, though some distortions or cracks in the corrugated sheet were observed when the length L exceeded 15 mm.

Next, as shown in the data of FIG. 6, it has been confirmed from the experiment that the occurrence of the distortions and cracks in the corrugated sheet is prevented when the interval Y and the pitch P of the slots 11a adjacent to each other in each of the slot arrays adjacent to each other are set under the following condition:

$$Y \geq -(1/2)P+14.5 \text{ mm}$$

Specifically, under the setting of the pitch P to 29 mm or more, the occurrence of the distortions and cracks in the corrugating sheet is prevented even when the interval Y is set to zero. As the pitch P is more reduced from 29 mm, it is necessary to widen the interval Y by a 1/2 ratio of a reduced amount of the pitch P.

Therefore, in the metal catalyst carrier of this embodiment of the invention, when the intervals X and Y, the length L, and the pitch P are set so as to fall within the ranges indicated by "OK" in the data of FIG. 4 to FIG. 6, the occurrence of the distortions and cracks in the corrugated sheet metal is prevented and thereby leading to better productivity.

In the foregoing, the embodiment of the invention has been described, but the present invention is not to be limited to the above-described embodiment of the invention, and design changes and so on without departing from the sprit of the present invention are to be embraced in the present invention.

For example, in the embodiment of the invention, the experiment was conducted using the sheet metals with a sheet thickness of 30 μm as the material of the corrugated sheet 11, but substantially the same result was observed in experiments using sheet metals with a sheet thickness of 20 μm to 50 μm, which may be adapted to the present invention.

Further, in the embodiment of the present invention, the each slot is formed in a shapes of a longitudinal slot, but the same effects are obtained with slots in other shapes, for example, a circular slot shape, which may be adapted to the present invention.

Further, in the embodiment of the present invention, the flat sheet 12 is used, but the same effects are obtainable when a slightly corrugated sheet having a smaller corrugation than that of the corrugated sheet 11 is used in place of the flat sheet 12, which may be adapted to the present invention.

The entire contents of Japanese Patent Application Tokugan 2002-359900 (filed Dec. 11, 2002) are incorporated herein by reference.

What is claimed is:

1. A metal catalyst carrier comprising: a highly corrugated sheet made of a sheet metal; and
    one of a slightly corrugated sheet and a flat sheet made of a sheet metal, said slightly corrugated sheet having a smaller corrugation than a corrugation of said highly corrugated sheet,
    wherein said highly corrugated sheet and the one of said slightly corrugated sheet and said flat sheet are stacked and rolled in multi-layers so as to form cell passages through which exhaust gas passes between said highly corrugated sheet and the one of said slightly corrugated sheet and said flat sheet,
    said highly corrugated sheet being provided with a plurality of slot arrays arranged in a cell passage direction respectively, the slot arrays having a plurality of slots which are formed before the sheet metal is corrugated and disposed along a direction perpendicular to the cell passage direction respectively, and
    wherein an interval X is set in the direction perpendicular to the cell passage direction between opening peripheral edge portions of the slots adjacent to each other in the slot arrays adjacent to each other, an interval Y being set in the cell passage direction between the opening peripheral edge portions of the slots adjacent to each other in the slot arrays adjacent to each other, the interval X and the interval Y being set under a condition satisfying $X \geq 0$ mm and $X \geq -(5/2)Y+10$ mm.

2. A metal catalyst carrier according to claim 1, wherein said highly corrugated sheet is 20 μm to 50 μm in sheet thickness.

3. A metal catalyst carrier according to claim 1, wherein a length L of each of the slots in the direction perpendicular to the cell passage direction is set under a condition of $L \leqq 15$ mm.

4. A metal catalyst carrier according to claim 2, wherein a length L of each of the slots in the direction perpendicular to the cell passage direction is set under a condition of $L \leqq 15$ mm.

5. A metal catalyst carrier according to claim 1, wherein the interval Y in the cell passage direction between the opening peripheral edge portions of the slots adjacent to each other in the slot arrays adjacent to each other and a pitch P of the slots in each of the slot arrays are set under a condition of $Y \geqq -(1/2)P+14.5$ mm.

6. A metal catalyst carrier according to claim 2, wherein the interval Y in the cell passage direction between the opening peripheral edge portions of the slots adjacent to each other in the slot arrays adjacent to each other and a pitch P of the slots in each of the slot arrays are set under a condition of $Y \geqq -(1/2)P+14.5$ mm.

7. A metal catalyst carrier according to claim 3, wherein the interval Y in the cell passage direction between the opening peripheral edge portions of the slots adjacent to each other in the slot arrays adjacent to each other and a pitch P of the slots in each of the slot arrays are set under a condition of $Y \geqq -(1/2)P+14.5$ mm.

8. A metal catalyst carrier according to claim 4, wherein the interval Y in the cell passage direction between the opening peripheral edge portions of the slots adjacent to each other in the slot arrays adjacent to each other and a pitch P of the slots in each of the slot arrays are set under a condition of $Y \geqq -(1/2)P+14.5$ mm.

* * * * *